J. E. GROSS.
LEVELING MEANS FOR WHEELED APPARATUS.
APPLICATION FILED MAY 24, 1917.

1,255,599. Patented Feb. 5, 1918.
7 SHEETS—SHEET 1.

Fig. 1.

Inventor
John E. Gross.
By Max A. Schmidt
Attorney

UNITED STATES PATENT OFFICE.

JOHN E. GROSS, OF WALLA WALLA, WASHINGTON.

LEVELING MEANS FOR WHEELED APPARATUS.

1,255,599.  Specification of Letters Patent.  Patented Feb. 5, 1918.

Application filed May 24, 1917. Serial No. 170,667.

*To all whom it may concern:*

Be it known that I, JOHN E. GROSS, a citizen of the United States, residing at Walla Walla, in the county of Walla Walla and State of Washington, have invented certain new and useful Improvements in Leveling Means for Wheeled Apparatus, of which the following is a specification.

This invention relates to tractors and other farm machinery, and its object is to provide a novel and improved means for maintaining the same in a level position on a hillside or on uneven ground.

The object stated is attained by means of a combination and arrangement of parts to be hereinafter described and claimed, and in order that the same may be better understood, reference is had to the accompanying drawings forming a part of this specification.

In the drawings—

Fig. 4ª is a sectional detail; Fig. 8 is an elevation thereof.

Figure 1:
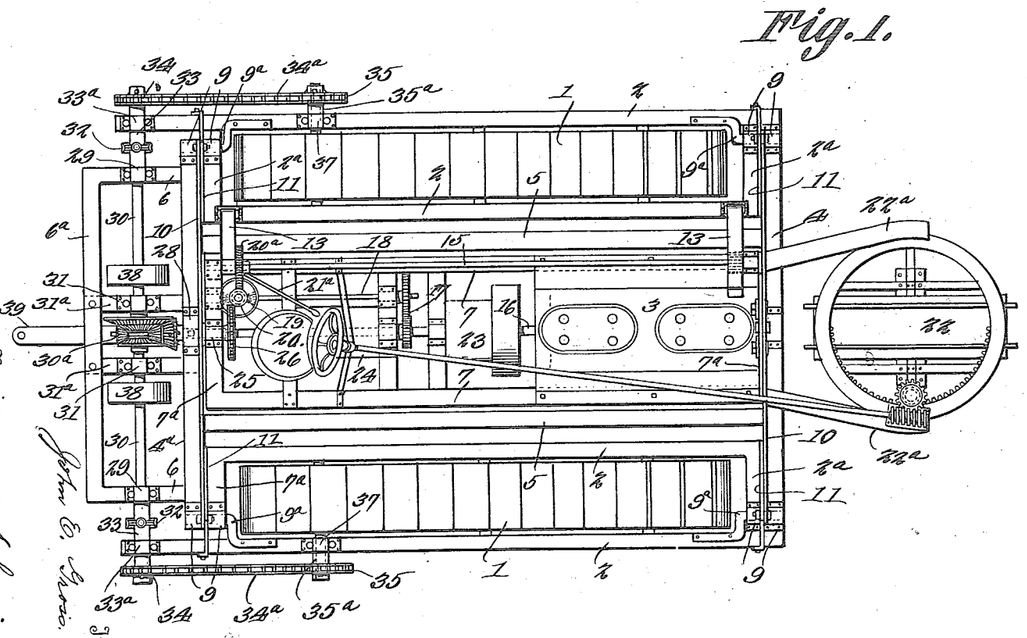
Figure 1 is a plan view of a tractor showing the application of the invention thereto.
Figure 2:
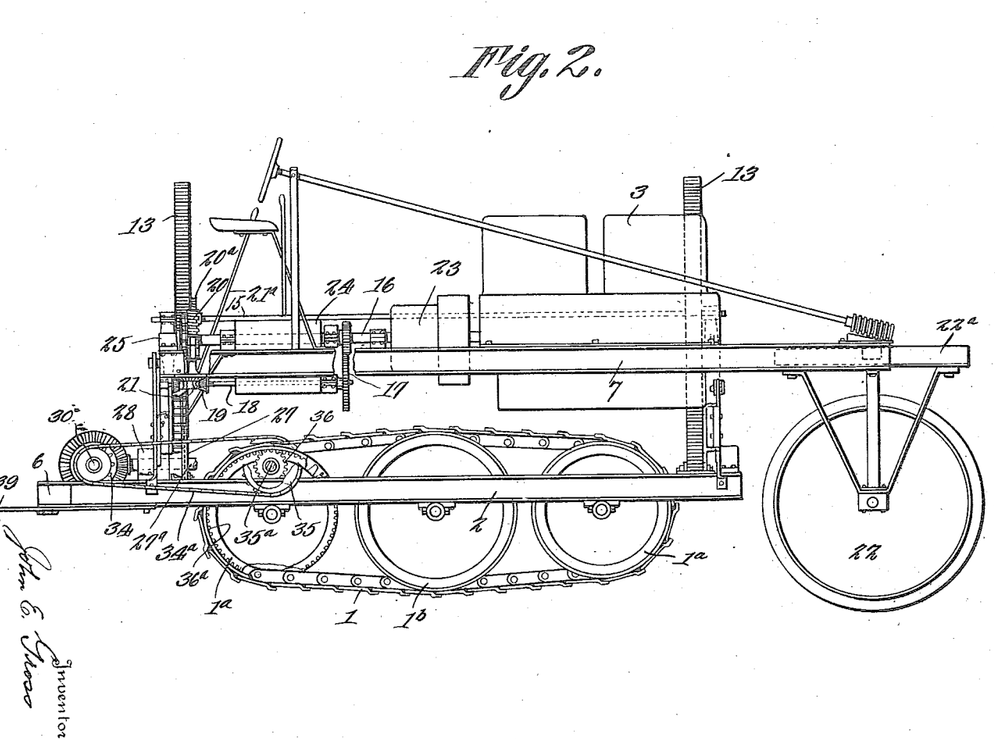
Fig. 2 is a side elevation of the tractor.
Figure 3:
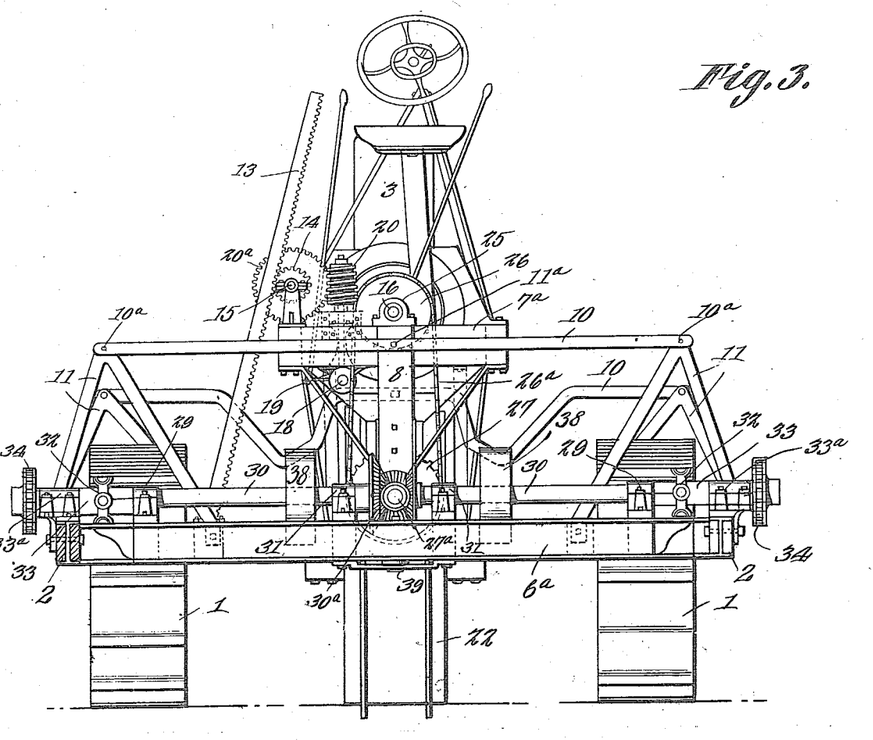
Fig. 3 is a rear elevation thereof.

Referring specifically to the drawings, the tractor shown in Figs. 1 to 4 is of the endless track or caterpillar type, it being driven by two endless tread belts or chains 1 trained over front and rear supporting wheels 1ª and an intermediate supporting wheel 1ᵇ. These wheels, on each side of the machine, are carried by a frame composed of spaced parallel side bars 2 connected at their ends by cross bars 2ª. The side bars carry suitable bearings for the axles of the wheels as shown in Fig. 1. The tractor also includes a main frame supporting an engine frame. The engine, shown at 3, may be an internal-combustion engine of any type.

The main frame has front and rear cross-bars 4 and 4ª, respectively, connected by longitudinal bars 5 which are parallel and laterally spaced. The rear end of the main frame has a shaft-supporting frame comprising short side bars 6 extending rearward from the rear cross-bar 4ª and connected at their rear ends by a cross-bar 6ª.

The engine frame has laterally spaced, parallel side bars 7 connected by front and rear cross-bars 7ª. From the cross-bars 4 and 4ª of the main frame rise standards 8 to the upper ends of which the cross-bars of the engine frame are fastened. The standards have a pivotal connection with the main frame for a purpose to be presently described.

The frames which carry the tread belts 1 and the wheels 1ª are pivoted or hinged to the main frame. As shown in Fig. 1, the belt and wheel supporting frame seat between the front and rear cross-bars 4 and 4ª of the main frame, and on said cross-bars and on the cross-bars 2ª are matching bearings 9 through which a pivot shaft 9ª extends, whereby the aforesaid pivotal or hinge connection between the frames is had, the pivotal axis being in the direction of the length of the machine, and parallel to the axis of the pivotal connection between the main frame and the standards 8.

Figures 4, 4A:
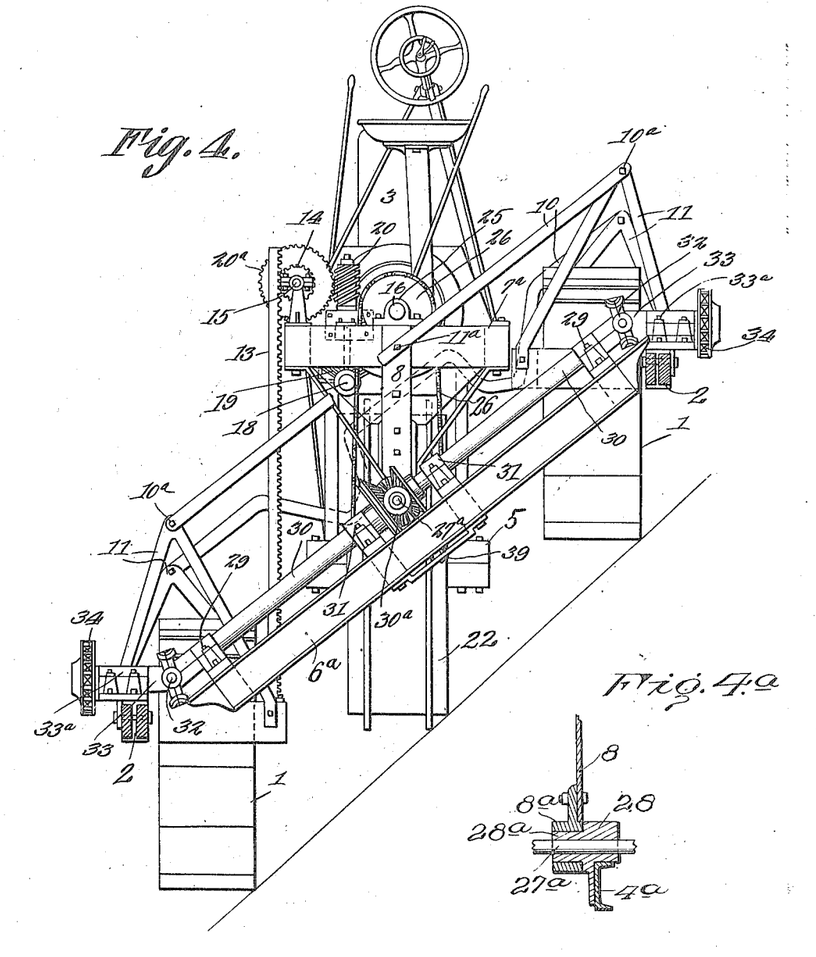
Fig. 4 is a rear elevation showing the parts in another position, certain parts in these views being broken away to render other parts clear.

It will be evident from the foregoing that when the machine is on the side of a hill as shown in Fig. 4, the supporting frame of one of the traction elements 1 is lowered and the other one is elevated with respect to the engine supporting frame, the latter frame remaining level, and the main frame tilting to come parallel to the sloping surface on which the machine is traveling or standing. The pivotal connection between the main frame and the engine supporting frame is midway between the ends of the cross-bars 4 and 4ª, and the main frame is free to tilt and thus accommodate itself to the various different horizontal planes in which the respective traction elements may move when the machine is on a hillside. The pivotal connection between the main frame and the supporting frame of the traction elements leaves said elements in proper running position and not affected by the tilting of the main frame.

In order that the two supporting frames of the traction elements may move in unison, they are connected at the front and rear by cross-bars 10, the latter being pivotally connected at their ends as shown at 10ª to inverted V-shaped braces 11 fastened to the front and rear ends of said frame. Midway between their ends, the cross-bars 10 are pivotally connected to the standards 8 as shown at 11ª. The front cross-bar is suitably shaped to clear the parts at this end of the machine.

The hereinbefore described leveling action is accomplished by the following means:

To one of the supporting frames of the traction elements 1, at the front and rear of said frame, are pivotally connected rack bars 13 which extend upwardly to mesh with pinions 14 on a power-driven shaft 15 carried by the engine supporting frame. The main drive shaft 16 of the engine 3 is connected by gears 17 to a jack shaft 18, and the latter, through a bevel gearing 19, drives the shaft of a worm 20 meshing with a worm wheel 20ª on the shaft 15. A suitable reversing clutch 21 is provided, the same being controlled by a hand lever 21ª.

At the front end of the machine is a steering wheel 22 provided with suitable controlling means and supported by forward extension 22ª of the side bars 7 of the engine supporting frame. The steering wheel therefore remains level with the engine supporting frame when the machine is on a hillside.

The traction elements 1 are driven by the engine shaft 16 through a gearing which will now be described. The shaft 16 has a clutch 23 and is also provided with the usual transmission gear inclosed in a housing 24. The rear end of the shaft 16 is supported by a bearing 25 on the rear cross bar 7ª of the engine frame and carries a sprocket wheel 26 which is connected by a chain 26ª to a sprocket wheel 27 on a shaft 27ª which passes through a bearing 28 on the rear cross bar 4ª of the main frame. The bearing 28 also forms a pivotal connection between the rear standard 8 and the main frame. As shown in Fig. 4ª, the bearing 28 has a hub extension 28ª on which is pivoted a socket member 8ª to which the lower end of the standard 8 is secured. The pivotal connection between the front standard and the main frame is made in line with the bearing 28. On the side bars 6 are bearings 29 in which are supported the alined sections of a counter-shaft 30 with which the shaft 27ª has a driving connection through an ordinary differential gear 30ª. The counter-shaft is also supported by bearings 31 on cross bars 31ª extending between the cross bars 4ª and 6ª.

One of the sections of the countershaft 30 has a driving connection with one of the traction elements, and the other shaft section has a driving connection with the other traction element. To the outer end of each shaft section is connected, by a universal or other flexible joint 32, a short shaft 33 supported in bearings 33ª on the outer side bars 2 of the supporting frame of the traction elements, this universal or flexible joint being for the purpose of permitting the hereinbefore described relative tilting movement of the main frame and the traction element supporting frames.

On each shaft 33 is a sprocket wheel 34 which is connected by a chain 34ª to a sprocket wheel 35 on a shaft 35ª carrying a pinion 36. On the rear one of the supporting wheels 1ª is an internal gear 36ª. One of the pinions 36 is in mesh with the internal gear of the supporting wheel on one side of the machine, and the other pinion is in mesh with the internal gear of the supporting wheel on the other side. The shafts 35ª are supported in bearings 37 carried by the side bars 2 of the supporting frames of the traction elements.

On the shaft sections 30 are brake drums 38, and to the rear end of the machine is connected a draw bar 39. The brake drums are for the purpose of retarding the motion of the machine, and also to assist the turning movement, as by braking one side, the other side advances and thus turns the machine, with the help of the steering wheel 22.

Figure 5:
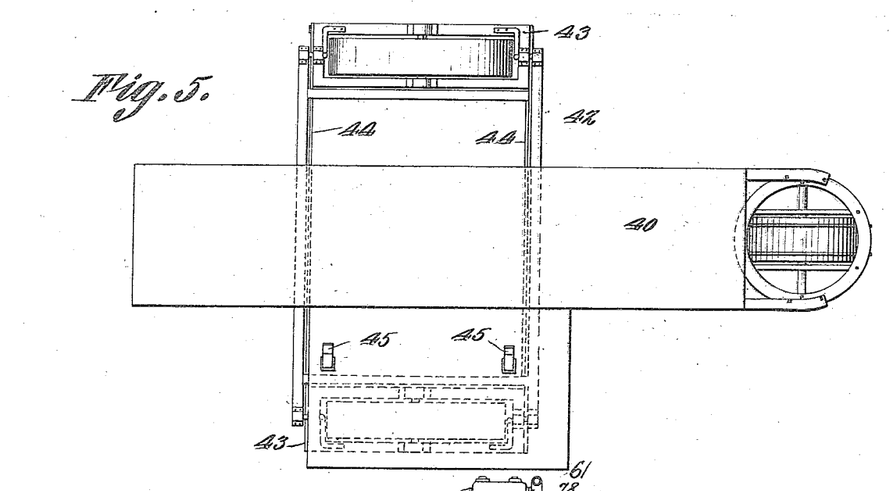
Fig. 5 is a plan view showing the invention applied to a thresher or similar farm implement.
Figure 6:
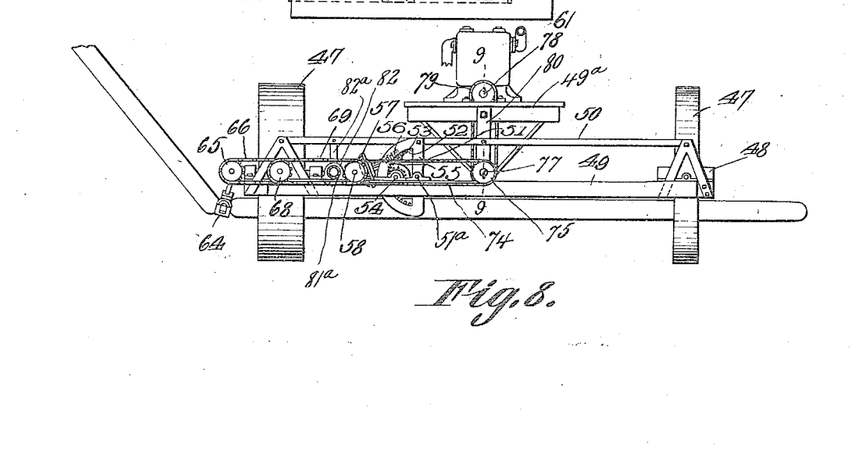
Fig. 6 is a rear elevation drawn to an enlarged scale.

Figs. 5 and 6 show the leveling mechanism applied to a thresher or other farm implement having a body frame 40 which has a pivotal connection, as shown at 41, with a tiltable frame 42 carrying pivoted wheel supporting frames 43. In this embodiment of the invention, cross bars 44, corresponding to the cross bars 10 hereinbefore described, are located below the frames. Racks 45 for effecting the leveling action are also provided, the body frame carrying a suitable mechanism for operating the racks. The forward end of the machine is supported by a steering wheel 46 carried by the body frame.

Figures 7, 9:
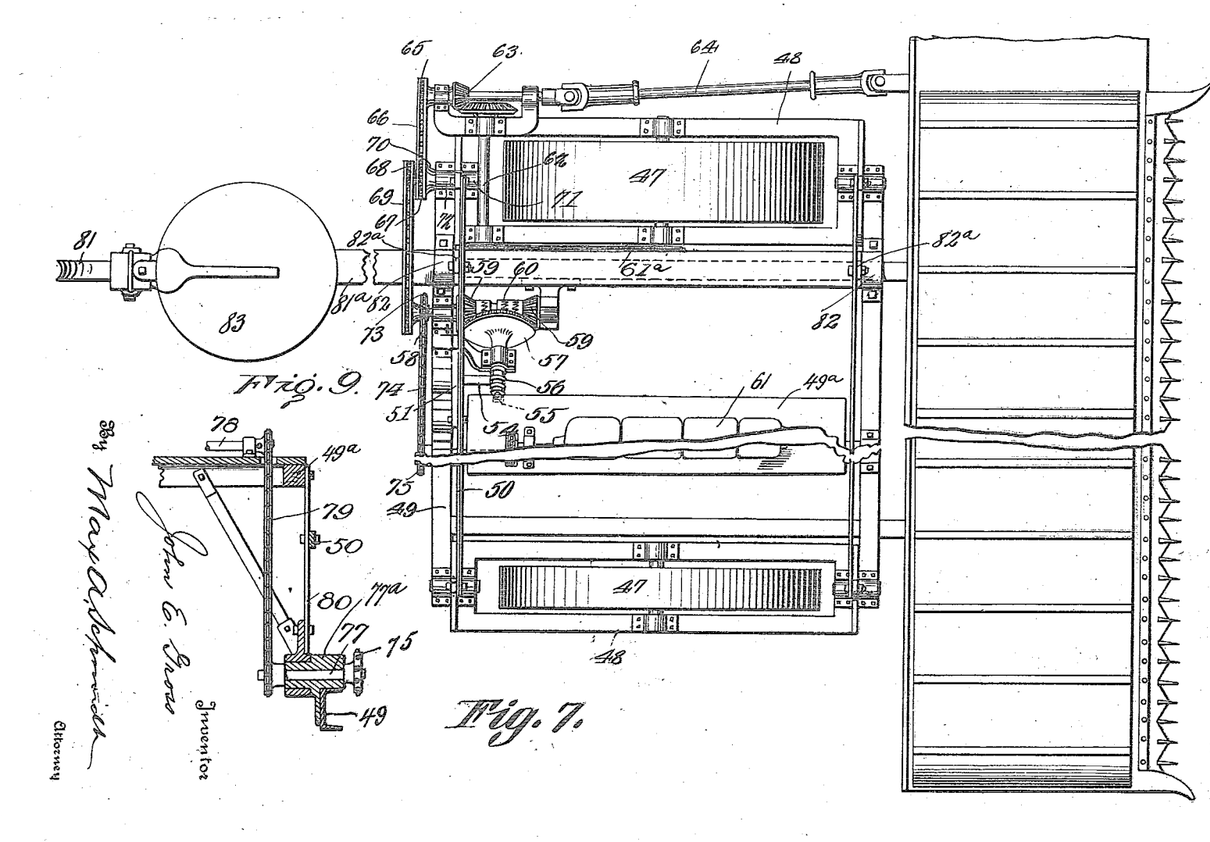
Fig. 7 is a plan view showing the invention applied to a header.
Fig. 9 is a sectional detail on the line 9—9 of Fig. 8.

Figs 7 to 9 show another embodiment of the invention, the leveling mechanism being here shown applied to a header or similar harvesting machine, supported on wheels 47 carried by frames 48 which have pivoted connections with a main frame 49, which latter supports an engine supporting frame 49ª. These frames are connected in the same manner as the frames of the tractor structure hereinbefore described. The connecting cross bar between the frames 48 is shown at 50. In this form of the invention a different mechanism is provided for effecting the leveling operation. To the cross bar 50 is connected a sector 51 pivoted at 51ª to the main frame 49 and having an internal gear 52 which meshes with a pinion 53 on a shaft 54 provided with a worm wheel 55 which is in mesh with a worm 56 on the shaft of a bevel gear 57 driven from a shaft 58 through bevel pinions 59, with a reversing clutch 60 associated with the last-mentioned shaft. The machine is driven by an engine 61 carried by the frame 49ᵃ, the following drive gearing being provided: The main drive wheel of the machine is connected by a sprocket-and-chain or other suitable gearing 61ᵃ to a countershaft 62 carried by the supporting frame of said wheel, this countershaft being connected by a bevel gearing 63 to the tumbling shaft 64 of the cutting mechanism. A sprocket wheel 65 on the shaft 64 is connected by a chain 66 to one of a pair of sprocket wheels 67 and 68, the other one of the said sprocket wheels being connected by a chain 69 to a sprocket wheel on the shaft 58. The sprocket wheels 67 and 68 turn together and are loose on a stub shaft 70 mounted in alined bearings 71 and 72, respectively. One of these bearings is on the supporting frame of the main drive wheel and the other bearing is on the frame 49, the shaft therefore making a pivotal connection between the frames. On the shaft 58 is a sprocket wheel 73 which is connected by a chain 74 to a sprocket wheel 75 on a shaft 77, which latter is driven from the engine shaft 78 through a sprocket-and-chain or other suitable gearing 79.

The shaft 77 is journaled in a bearing 77ᵃ similar to the bearing 28 hereinbefore described and supporting a standard 80 which carries the engine frame 49ᵃ. It will be understood that the other end of the engine frame is supported in a similar manner. The cross bars 50 are pivotally connected to the standards 80 as before.

The machine also has a rear steering wheel 81 carried by a pole 81ᵃ housed in bearings 82 on the main frame 49 with a connection 82ᵃ between the tongue and the cross bars 50 to keep the tongue platform 83 level.

The preferred embodiments of the invention have been described and illustrated, but it will be understood that various other changes and modifications in the gearing and other details may be made without a departure from the spirit and scope of the invention as claimed hereinafter.

I claim:

1. In a wheeled apparatus, the combination of a main frame, traction elements at the sides of the main frame, supporting frames for the traction elements pivoted to the main frame on axes parallel to the length of the latter, a third frame carried by the main frame and having a pivotal connection therewith to permit the main frame to tilt transversely, a rack bar connected to one of the supporting frames of the traction elements, a pinion carried by the third frame and meshing with the rack bar, and actuating means for the pinion carried by the third frame.

2. In a wheeled apparatus, the combination of a main frame, traction elements at the sides of the main frame, supporting frames for the traction elements pivoted to the main frame on axes parallel to the length of the latter, a third frame carried by the main frame and having a pivotal connection therewith to permit the main frame to tilt transversely, a transverse bar connected at its ends to the respective supporting frames of the traction elements, and having a pivotal connection intermediate its ends with the third frame, a rack bar connected to one of the supporting frames of the traction elements, a pinion carried by the third frame and meshing with the rack bar, and actuating means for the pinion carried by the third frame.

3. In a wheeled apparatus, the combination of a main frame, traction elements at the sides of the main frame, supporting frames for the traction elements pivoted to the main frame on axes parallel to the length of the latter a third frame carried by the main frame and having a pivotal connection therewith to permit the main frame to tilt transversely, a cross connection between the aforesaid supporting frames, a drive shaft carried by the main frame, driven shafts flexibly connected to the ends of the drive shaft, said driven shafts being carried by the supporting frames of the traction elements, and driving connections between the driven shafts and the traction elements.

4. In a wheeled apparatus, the combination of a main frame, traction elements at the sides of the main frame, supporting frames for the traction elements pivoted to the main frame on axes parallel to the length of the latter, a third frame carried by the main frame and having a pivotal connection therewith to permit the main frame to tilt transversely, a transverse bar connected at its ends to the respective supporting frames of the traction elements, and having a pivotal connection intermediate its ends with the third frame, a drive shaft carried by the main frame, driven shafts flexibly connected to the ends of the drive shaft, said driven shafts being carried by the supporting frames of the traction elements, and driving connections between the driven shafts and the traction elements.

5. In a wheeled apparatus, the combination of a main frame, traction elements at the sides of the main frame, supporting frames for the traction elements pivoted to the main frame on axes parallel to the length of the latter, a third frame carried by the main frame and having a pivotal connection therewith to permit the main frame to tilt transversely, a rack bar connected to one of the supporting frames of the traction elements, a pinion carried by the third frame and meshing with the rack bar, actuating means for the pinion carried by the third frame, a drive shaft carried by the main frame, driven shafts flexibly connected to the ends of the drive shaft, said driven shafts being carried by the supporting frames of the traction elements, and driving connections between the driven shafts and the traction elements.

6. In a wheeled apparatus, the combination of a main frame, traction elements at the sides of the main frame, supporting frames for the traction elements pivoted to the main frame on axes parallel to the length of the latter, a third frame carried by the main frame and having a pivotal connection therewith to permit the main frame to tilt transversely, a transverse bar connected at its ends to the respective supporting frames of the traction elements, and having a pivotal connection intermediate its ends with the third frame, a rack bar connected to one of the supporting frames of the traction elements, a pinion carried by the third frame and meshing with the rack bar, actuating means for the pinion carried by the third frame, a drive shaft carried by the main frame, driven shafts flexibly connected to the ends of the drive shaft, said driven shafts being carried by the supporting frames of the traction elements, and driving connections between the driven shafts and the traction elements.

In testimony whereof I affix my signature.

JOHN E. GROSS.